United States Patent [19]

Sanford et al.

[11] 4,093,469

[45] June 6, 1978

[54] MOLDED GLASS ARTICLES HAVING BULK HOMOGENEITY AND OPTICAL QUALITY SURFACE

[75] Inventors: Leon M. Sanford; Che-Kuang Wu, both of Corning, N.Y.

[73] Assignee: Corning Glass Works, Corning, N.Y.

[21] Appl. No.: 789,105

[22] Filed: Apr. 20, 1977

Related U.S. Application Data

[62] Division of Ser. No. 689,791, May 25, 1976, Pat. No. 4,046,545.

[51] Int. Cl.$^2$ .................. C03C 3/10; C03C 3/04; C03C 3/30
[52] U.S. Cl. .................. 106/53; 106/47 Q; 106/52
[58] Field of Search .................. 106/52, 53, 47 Q

[56] References Cited

U.S. PATENT DOCUMENTS

| | | | |
|---|---|---|---|
| 3,498,802 | 3/1970 | Bickford et al. | 106/52 |
| 3,498,803 | 3/1970 | Stookey | 106/52 |

*Primary Examiner*—Winston A. Douglas
*Assistant Examiner*—Mark Bell

*Attorney, Agent, or Firm*—James A. Giblin; Clinton S. Janes, Jr.; Clarence R. Patty, Jr.

[57] ABSTRACT

An optical glass article having a desired surface figure and demonstrating maximum theoretical light transmission can be prepared by forming a base anhydrous glass of defined compositional ranges, hydrating the glass, partially dehydrating the glass at a temperature above the softening point and, using an inert gas, at a pressure above the vapor pressure of water contained therein, and then molding a preformed blank of the glass against a die having a desired optical quality surface figure, the molding being under conditions sufficient to transfer the surface figure of the die to the glass. The base glass comprises, in mole percent, about 70 to 82% $SiO_2$, 10 to 17% $Na_2O$ and/or $K_2O$, and 5 to 15% of an oxide or oxides selected from ZnO and PbO. The water content of the partially dehydrated glass ranges from about 3 to 8 wt. percent and the molded glass has a substantially uniform refractive index throughout its bulk. Homogeneous distribution of the water throughout the glass bulk appears to be assured by limiting the total water content to a range at which the diffusion coefficient of the water species ($H_2O$, $H^+$, and $OH^-$) exhibits the greatest dependence on the total water concentration (i.e. the range at which the coefficient is a quasi-step function).

4 Claims, 10 Drawing Figures

MOLDED GLASS ARTICLES HAVING BULK HOMOGENEITY AND OPTICAL QUALITY SURFACE

RELATED APPLICATIONS

This is a division of application Ser. No. 689,791, filed May 25, 1976 now U.S. Pat. No. 4,046,545.

Patent application Ser. No. 640,733 filed in the name of C. K. Wu, entitled "Optical Articles Prepared from Hydrated Glasses" and patent application Ser. No. 640,735, now U.S. Pat. No. 4,026,692, filed in the name of R. F. Bartholomew entitled "Optical Articles from Acid Hydrated Glasses", both applications filed Dec. 15, 1975 and assigned to the present assignee.

BACKGROUND OF THE INVENTION

1. Field

This disclosure relates generally to the field of hydrated glass materials and specifically to hydrated glasses having properties useful for optical applications.

2. Prior Art

The hydration of various glass compositions is well known. See, for example, U.S. Pat. No. 3,498,802 and U.S. Pat. No. 3,489,803, both of which disclose how low temperature thermoplastic-type behavior can be imparted to glass by incorporating varying amounts of water within the glass structure. See also U.S. Pat. No. 3,912,481 which discloses a hydration-dehydration process wherein the importance of carefully controlling the final water content is disclosed.

The low temperature thermoplastic-type behavior associated with certain hydrated glasses has suggested various practical applications where the desirable properties of glass and low temperature thermoplasticity can be advantageously combined. Recently, in patent applications Ser. No. 640,733 and Ser. No. 640,735, both cited above as related applications, it has been disclosed that under defined conditions, it is possible to mold certain hydrated glass compositions in such a manner that an optical quality surface on a die is transferred to the molded article. This permits the preparation of an optical quality surface on a glass body without the need for grinding and polishing steps, thus suggesting numerous economies in optical components manufacture.

In Ser. No. 640,733, as well as this application, the expression "optical quality surface", or its equivalent, refers to a surface having a "Roughness Height" the arithmetic average (AA) of which is less than 3.0 microinches ($3.0\mu$ inches) over a distance of at least 0.1 inch. A very preferred optical quality surface has a Roughness Height, the AA of which is less than $1.6\mu$ inches over the same distance. The expression "Roughness Height", for purposes of defining a standard (of surface smoothness), is described as the arithmetic average (AA) deviation (of a surface instrument trace) expressed in microinches ($\mu$ inches) measured normal to the centerline. Arithmetic Average (AA) is also known in British Standards as Center Line Average (CLA). This and related terminology is explained more fully in the publication, Surface Texture, ASAB 46.1 — 1962, published by the American Society of Mechanical Engineers, New York, N.Y.

Various instruments which can measure surface smoothness in the above terms are known (e.g. Proficorder ®, Surfanalyzer ®). Detailed descriptions concerning the use of such instruments can be found in manuals used with the instruments and other publications. According to one such manual (Gould Surfanalyzer ®, Model 1200), the results of surface measurement, expressed in AA, can be converted approximately to the root means square (rms) average by multiplying the AA by 1.11. Hence, surface smoothness can be expressed in AA units or rms units over a given surface. An example of rms measurements is described in an article entitled, "Polishing of Supersmooth Metal Mirrors", Applied Optics, Vol. 14, No. 8, pp. 1808–1812, August, 1975. See also an article entitled, "Surface Characterization: A Total Approach", Research/Development, November, 1975.

Although the disclosure of Ser. No. 640,733 is concerned primarily with the preparation of an optical quality surface in a glass article via molding techniques, it was noted that the articles molded had a relatively high light transmittance, compared with known sintered inorganics. For example, in one molded disc made according to the above disclosure, a value of 89% total transmittance (as defined in ASTM D 1003) was obtained. That disc, however, demonstrated a 2 to 3% backward scattering from the bulk (interior), and 5 to 20% of the light beam intensity was deflected 0.1° to 10° due to bulk inhomogeneity. Although such bulk inhomogeneity can be tolerated in lower grade optical articles or articles such as reflecting mirrors where only the surface smoothness must have an optical quality, it can be appreciated that a high quality optical article used for transmittance of light should permit near theoretical transmittance of light — e.g. the article should be capable of transmitting that amount of light which approaches or is equal to the maximum amount theoretically possible for the glass. Such high degree of transmissivity (about 92%) requires a substantially uniform refractive index throughout the bulk of the glass and optical quality surfaces on the glass. A constant refractive index requires an extremely high degree of bulk homogeneity in the glass. In the case of a hydrated glass, this means that there must be no water concentration gradients in the glass bulk and total water content must be homogeneously distributed therein.

The present disclosure is concerned with an improvement over the disclosures cited in Ser. No. 640,733 in that it has been found that by carefully controlling a dehydration step and by molding a preformed shape, it is possible to achieve not only an optical quality surface and a given figure, but also a bulk (interior) capable of transmitting an amount of light substantially equal to the amount theoretically possible. Also, the surface figure of the die can be transferred to the glass. Details of our methods are described herein.

SUMMARY OF THE INVENTION

Our method of preparing an optical glass article having an optical quality surface, a desired surface figure, and capable of transmitting an amount of light about equal to the maximum amount theoretically possible comprises the following steps of:

(A) preparing a base anhydrous glass comprising in mole percent on the oxide basis about 70 to 82% $SiO_2$, 10–17% $Na_2O$ and/or $K_2O$, and 5 to 15% of an oxide or oxides selected from ZnO and PbO;

(B) hydrating the base glass to include a water content of at least 10 weight percent;

(C) partially dehydrating the glass to a water content ranging from about 3 to 8 weight percent at a temperature above the softening point of that glass and, using an inert gas, at a total pressure above the vapor pressure of the water contained within the glass at a given time; and (D) molding a preformed sample of the dehydrated glass against a die having a desired optical quality surface figure under molding conditions sufficient to permit replication of the surface figure of the die on the molded glass article, the molding being done under conditions sufficient to maintain the water content of the glass (e.g. no steam loss) and to maintain or result in an optical quality surface on that portion of the glass to which the surface figure of the die is transferred. Various preferred embodiments of our method are described below.

SPECIFIC EMBODIMENTS

Figure 1:
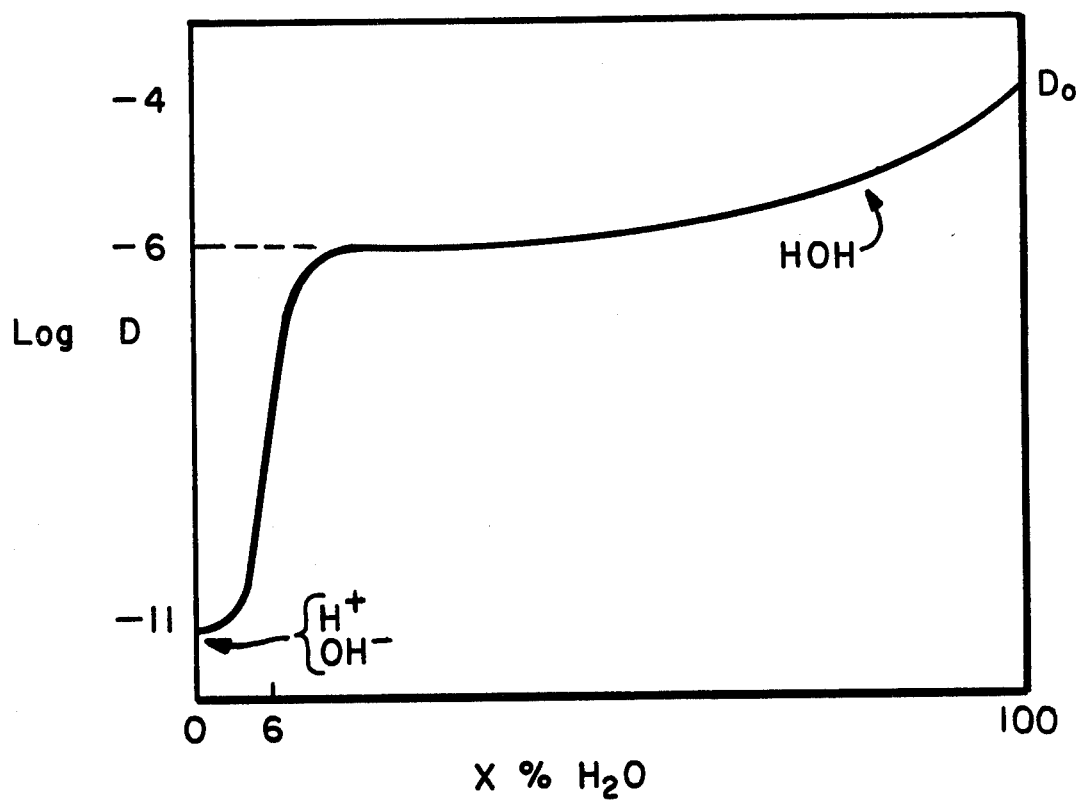
FIG. 1 is a graph illustrating approximately the assumed diffusion coefficient of water as a function of water content in glass.

The base anhydrous glass of this invention is quite similar to that base glass disclosed in Ser. No. 640,733. The base glass, which can be made by conventional means, comprises, in mole percent on the oxide basis, about 70 to 82% $SiO_2$, 10 to 17% $Na_2O$ and/or $K_2O$, and 5 to 15% of an oxide or oxides selected from ZnO and PbO. Up to 5% $Al_2O_3$ and/or $ZrO_2$ is preferably added. Additions of up to 3% $B_2O_3$ and/or MgO are useful in controlling the viscosity of the hydrated glass during the hydration step. Part or all of the ZnO may be replaced by PbO of equal mole percent. BaO may replace part of the ZnO and alkali up to a total of about 5%.

It should be stressed that the preparation of the base glass and the subsequent hydration are not per se a critical part of the present invention. Rather, very important to the present invention are the dehydration step and the form of the dehydrated article just prior to molding. The form (referred to as preform) of the dehydrated article must approximate the final molded product, thus, essentially excluding the use of granules and other non-pre-formed shapes. In general, the dehydrated glass of this disclosure should have the properties of the "silanol" glasses of Ser. No. 640,733 (e.g. ratio of silanol groups to molecular water equal to or greater than 1.0, water species "tightly" bound with no loss below about 120° C.). In copending application Ser. No. 640,733, the preferred molding process permits the leakage of steam to release air pockets. In the present case the leakage of steam during the molding process is prevented to avoid surface dehydration.

Glass blanks of convenient sizes, thickness, and shapes with above compositions are hydrated in saturated steam at elevated temperatures (preferred temperature ranges from 250° to 300° C.). The fully hydrated glasses are then partially dehydrated in a controlled manner with the two conditions specified below to produce hydrated/dehydrated glasses of optical quality (having a constant refractive index) in the bulk:

(1) Throughout the dehydration period, temperatures of dehydration are kept above the softening point of the hydrated glass which is being dehydrated. This allows the shrinkage of hydrated glass as it loses water. For a fixed temperature of dehydration there is thus a limit to the extent of allowed dehydration.

(2) Inert gas, e.g. nitrogen, is introduced to maintain the total pressure $P_T$ greater than the vapor pressure of the hydrated glass throughout the dehydration period. A preferred method is to keep the dehydration temperature constant and the total pressure at about 1.25 $(P_{H_2O}°)$, i.e.

$$P_T = P_{N_2} + P_{H_2O} \geq 1.25\, P_{H_2O}°$$

where $P_{N_2}$ is the partial pressure of nitrogen, $P_{H_2O}$, which represents the partial pressure of steam, is less than $P_{H_2O}°$ (e.g., $P_{H_2O} = 0.3\, P_{H_2O}°$). $P_{H_2O}°$ is the saturated vapor pressure of water at the temperature of dehydration.

In a preferred embodiment, the hydration and dehydration procedures are undertaken as a unit in an autoclave with inlet and outlet valves. In changing operation conditions from hydration to dehydration, various known methods can be used to introduce inert gas and to reduce the partial pressure of the steam while the total pressure $P_T$ is kept above the desired values to prevent foaming and/or bubbling of the glass. As noted above, we found that it is possible to release the excess liquid water which is left over from the hydration period, and to lower the relative humidity (RH) to well below 100% rapidly without causing foaming, provided that the total pressure is kept greater than $P_{H_2O}°$. In practice $P_T$ was kept about 1.25 $(P_{H_2O}°)$, since the temperature of the autoclave which was used did fluctuate, especially during the change from hydration to dehydration operation. This is because a nonsteady state period exists. Examples of hydration/dehydration methods as well as results of present invention are described in the Example below. One of the unique features of this invention, is the fact that water concentration of hydrated/dehydrated glass of the present invention reaches equilibrium with the steam atmosphere in a reasonably short dehydration period. This is a result of the combined effect of conditions imposed by the present method. Firstly, dehydration is carried out above the softening point (softening point is defined here as the minimum temperature at a given time at which hydrated glasses shrink under inert gas pressure). Secondly, foaming is prevented by the excess inert gas over the vapor pressure of the water in the glass.

In general, it has been found that control of bulk homogeneity is also directly dependent on control of the final water content in a given glass composition. The importance of controlling the final water content and, hence, bulk homogeneity, can be readily appreciated by considering the mechanism whereby water diffuses through the glass. Although the exact mechanism is not completely understood, it is thought that the phenomenon can be explained as follows: It is known that when the diffusion coefficient D is a function of the concentration of the diffusion species (i.e. HOH, $H^+$, and $OH^-$), the concentration profile is not an error function, and that the concentration profile approaches a step function (a quasi-step function) if the water concentration dependence of D is increasingly stronger. Hydrated-dehydrated glasses with a constant (homogeneous) water concentration through the glass bulk may be obtained only at the water concentration range where the diffusion coefficient shows the strongest dependence on the concentration of water (at the quasi-step range). It is assumed that such a strong dependence of D on water concentration occurs at the water level where the diffusion mechanism changes (e.g. HOH to $H^+$ and $OH^-$ or vice versa). This relationship is qualitatively illustrated in FIG. 1 for a preferred glass composition in the present disclosure (i.e. anhydrous composition is, on a mole % basis, 77.00% $SiO_2$, 10.82% $Na_2O$, 3.04% $K_2O$, 1.29% $Al_2O_3$, and 7.79% ZnO. From FIG. 1, it can be seen that for that glass composition, the dominant diffusion species changes from $H^+$ and $OH^-$ to molecular water HOH at a water content range of about 3 to 8 wt.%, thus illustrating that the final desirable water concentration should be within that range.

A diffusion mechanism which is distinctly different from the diffusion of water in anhydrous glass or hydrated glasses of very low water concentration, appears to occur. As a result of the present method, water concentration is uniform throughout the bulk of the hydrated/dehydrated article, and the rate of dehydration is kept high. These are some of the more important distinguishing features of the present invention from past methods which typically resulted in foaming during dehydration or resulted in hydrated glass articles of non-uniform water concentration.

Figure 4:
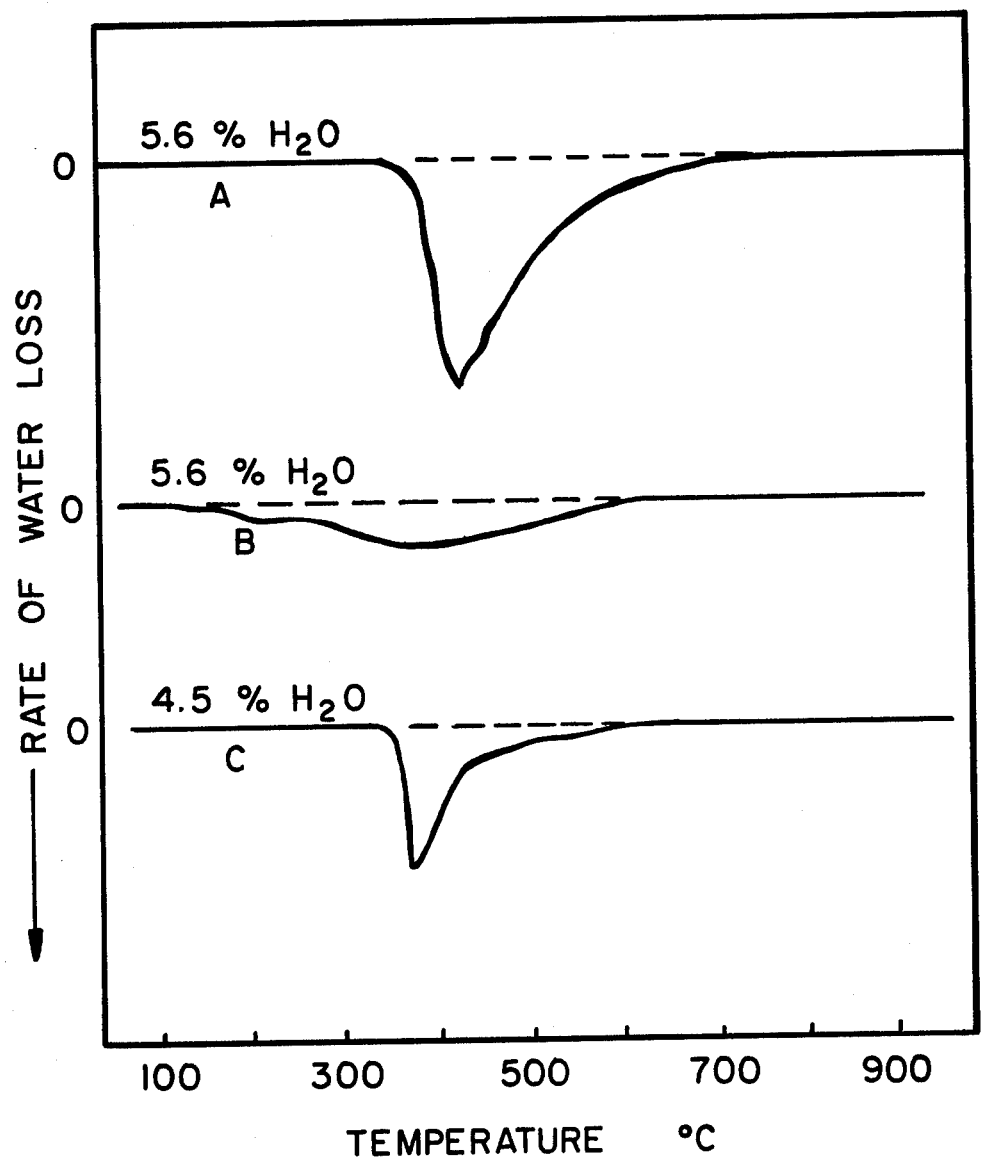
FIG. 4 illustrates rate of water loss as a function of temperature for three glasses and the effects of nitrogen over pressure on glass during partial dehydration and molding.

It was found that the hydrated-dehydrated glass of the present disclosure is more stable than the foamed glass. This is illustrated by the curves in FIG. 4. FIG. 4 illustrates the effect of inert gas pressure on the temperature range of water release as measured by differential thermal gravimetric analysis (DTG) technique. The water concentration of each sample is indicated in the figure. Curve A is a DTG plot of the hydrated-dehydrated glass of the present invention. The glass with the base composition, on mole percent basis, of 77.0% $SiO_2$, 10.82% $Na_2O$, 3.04% $K_2O$, 1.29% $Al_2O_3$ and 7.79% ZnO, was hydrated and dehydrated at 300° C. Curve B represents the hydrated glass of the same base composition but dehydrated without nitrogen over pressure (e.g. not at a pressure above the vapor pressure of the water in the glass, using an inert gas). The DTG of the resulting porous material is recorded. Curve C — the porous material represented by Curve B is molded according to the disclosure of Ser. No. 640,733 to a transparent disc. The DTG of the molded disc is recorded. From the curves of this figure it is clearly illustrated that the nitrogen over pressure not only prevents foaming and keeps optical quality of glass in the bulk but also increases the stability of the hydrated glasses. Shown in this figure is the DTG plot of a disc molded from the granules following the method disclosed in Ser. No. 640,733. (See Curve B.)

The preferred temperature of dehydration is limited to not exceeding 200° C. above the softening temperature of the hydrated-dehydrated glass for the following reasons:

(1) Dehydration at higher temperatures distorts the glass articles from their original shape readily.

(2) To obtain a hydrated-dehydrated glass of a fixed water level, e.g. 7% $H_2O$, the required partial pressure of steam increases very rapidly with an increasing temperature of dehydration.

Figure 3:
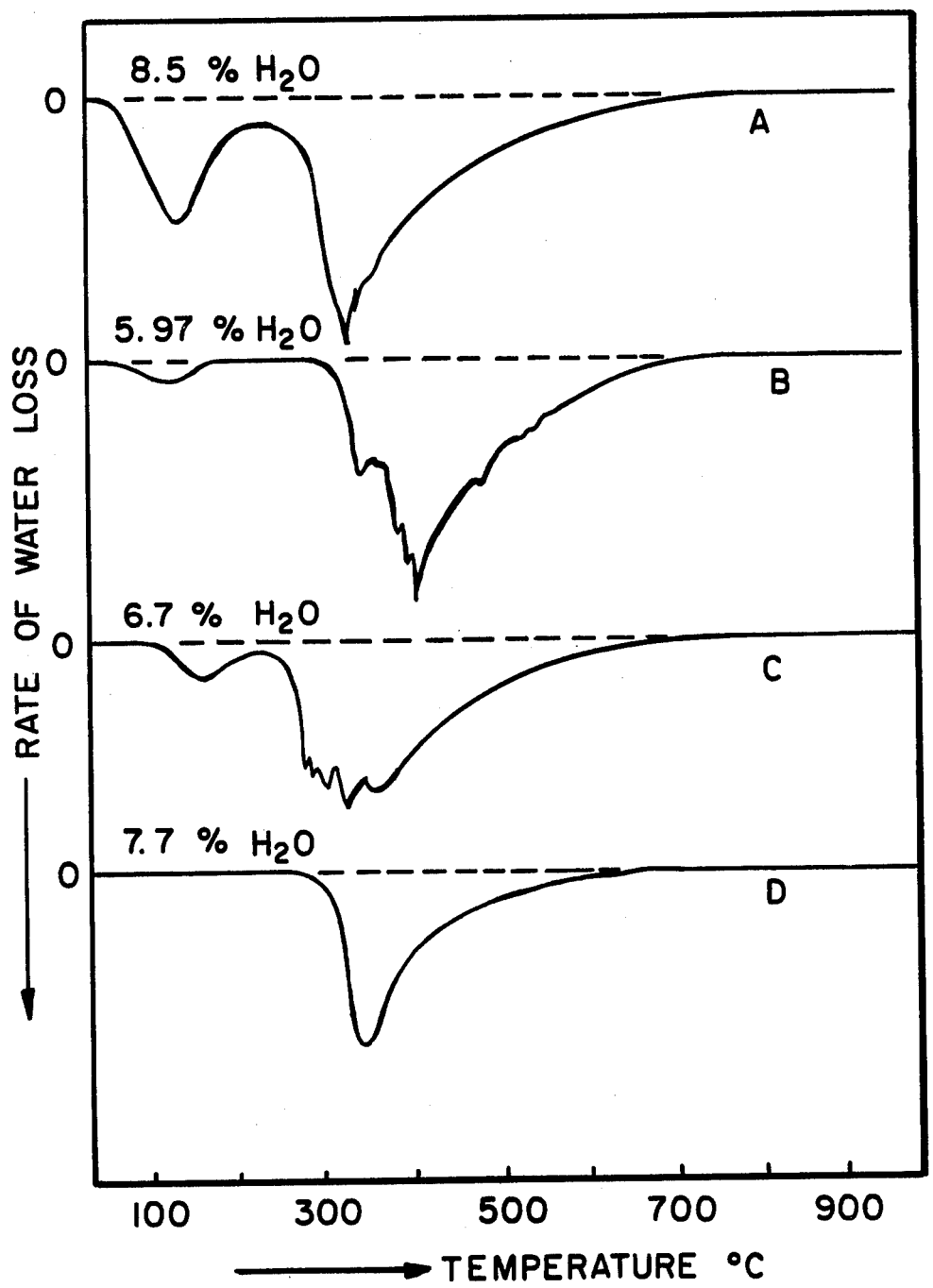
FIG. 3 illustrates rate of water loss as a function of temperature for glasses having four varying water contents.

As a result, it is a practical difficulty to prevent rehydration of the hydrated-dehydrated glass during cooling the autoclave down from the temperature of dehydration. FIG. 3 illustrates the DTG plot of hydrated-dehydrated glasses. The water concentration of each sample is indicated in the figure. Curve A — a 2 mm anhydrous glass plate was hydrated at 300° C., then dehydrated at 350° C. and 30% RH. It took 8 hours to cool the autoclave down to 100° C. The dehydrated glass in the autoclave is rehydrated during cooling down. There is thus a prominant peak around 150° C. Curve B — same as that of Curve A, except the autoclave is cooled down from 350° C. to 100° C. in 3 hours. Rehydration has taken place to a less extent. Curve C — a 2 mm anhydrous glass plate is hydrated at 300° C., then dehydrated at 400° C. and cooled down to 100° C. in 3 hours. Some rehydration has taken place. Curve D — a 2 mm anhydrous glass plate is hydrated at 300° C. Then dehydrated at 250° C. and cooled down to 100° C. in 3 hours. No evidence of rehydration is observed. As shown in FIG. 3, rehydration causes the existence of the lower temperature peak in DTG plot and defeats the purpose of dehydration. Namely, the glass represented by curves A, B, and C of FIG. 3 are not stable at 100° C. Whereas the glass of Curve D is stable. It is interesting to note that the high temperature band in the DTG plot is resolved into several peaks for the glasses dehydrated at higher temperatures. This may be an indication that more extensive reaction of water with glass took place.

The following information should be noted for proper interpretation of the DTG plots:

The sample for DTG analysis is placed in a macro-sample holder and is heated up at a rate of 10° C./min. in the atmosphere of dry air which has a flow rate of 5.72 l/hr. The reference weight is 100.2 mg of $Al_2O_3$. The area under the dotted line is proportional to (% $H_2O$) × (weight of sample). Since the amount of sample used is different in each run, % $H_2O$ for each sample is labeled in the figures.

As shown below, blanks of hydrated/dehydrated glasses of the present invention, of approximate size and shape (preforms), can be molded to articles with optical quality in the bulk. At the same time, a desired surface figure and optical quality of surface smoothness can be formed, provided that the molding process is carried out with a die having a surface figure which is required for the glass article. This can be achieved, e.g., with tungsten carbide as a mold surface having an optical quality surface and the desired surface figure. Further, since it is important that no dehydration of the glass occurs during molding, a tight seal against the leakage of steam should be assured in the die assembly.

Figure 5:
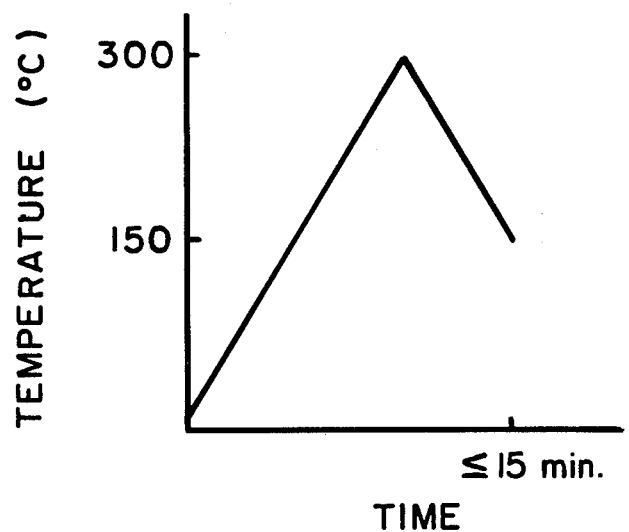
FIGS. 5 and 6 illustrate typical temperature and pressure vs. time relationships used in the molding of a preferred example.
Figure 6:
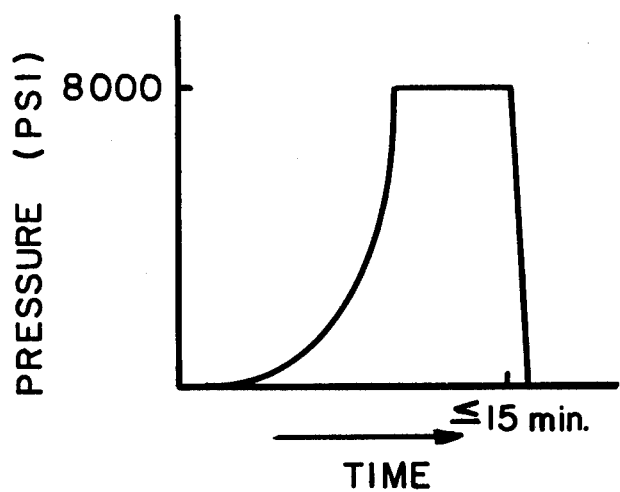
Figure 7:
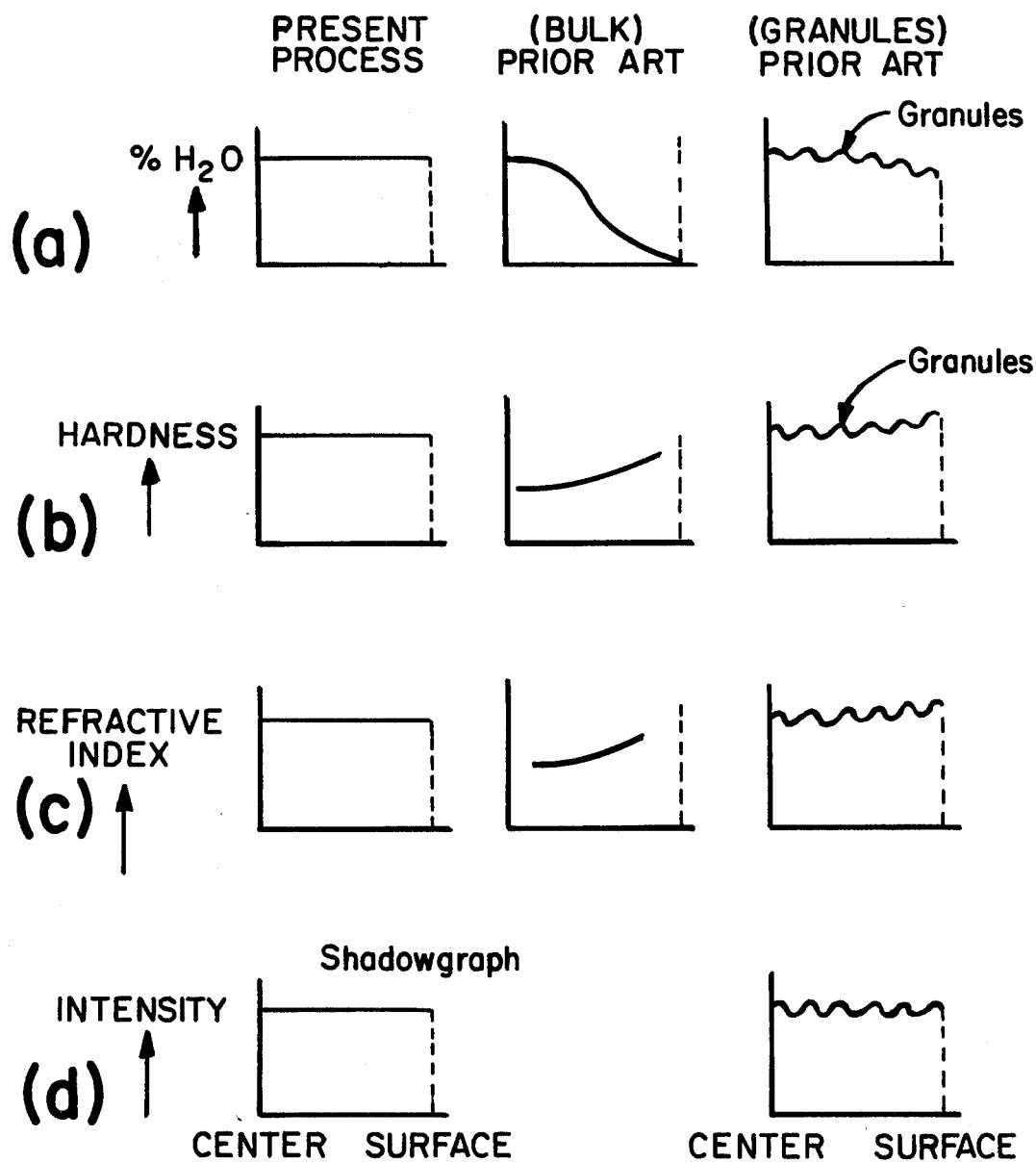
FIGS. 7(a)–(d) illustrate the effects bulk homogeneity (left) and inhomogeneity (center and right) on article hardness, refractive index, and intensity of light transmittance.

Molding temperatures and pressures are strong functions of the water concentration of the hydrated/dehydrated glass blank. An example of molding conditions for molding a 0.5 inch dia. plano-concave lens is shown in FIGS. 5 and 6. Various illustrations of how the present invention offers a homogeneous bulk having properties differing from non-homogeneous hydrated forms and articles prepared with granules (non-preforms) are shown in FIGS. 7(a) through 6(d). Examples of our best methods to date are described below. The overall steps can be summarized as follows:

1. Prepare an anhydrous glass within the defined compositional ranges.
2. Form a glass article (e.g. plate) of appropriate shape and thickness, (e.g. 4mm) from which the desired preformed shape can be obtained most economically.
3. Hydrate the glass in saturated steam (e.g. 300° C. for 4 days).
4. Partially dehydrate in accordance with this disclosure (e.g. at 300° C., 30% RH, with nitrogen over pressure for 7 days).
5. Prepare an approximate preformed shape, if necessary and grind and polish if desired.
6. Mold against a die having an optical quality mold surface and the desired surface figure (e.g. flat, spherical, aspherical, etc.).

EXAMPLES

In the first example, a 1000 gram sample of glass consisting, in mole % on an oxide basis, of 77.00% $SiO_2$, 10.82% $Na_2O$, 3.04% $K_2O$, 1.29% $Al_2O_3$, and 7.79% ZnO was hydrated and then carefully dehydrated in a 28 liter autoclave. After hydration at 300° C. and 100% relative humidity (RH), a calculated amount of water was taken out of the autoclave from an outlet at the bottom of the autoclave and at a temperature lower than the hydration temperature. The exact schedule was as follows:

| | |
|---|---|
| Amount of water fed into 28l autoclave before hydration process | 2000 grams |
| Amount of glass fed into the autoclave | 1000 |
| Amount of water in the vapor phase of 28l autoclave during hydration period at 300° C and 100% RH | 1288 |
| Expected amount of water in glass after dehydration | 60 |
| Expected amount of water in the vapor phase during dehydration at 30% RH and 300° C | 386.4 |
| Amount of water taken out in order to shift from hydration to dehydration process is 2000−386.4−60 | 1554 |

To eject this amount of water from the autoclave while keeping total pressure in the autoclave constant and where $$P_T = P_{H_2O} + P_{N_2} > P_{H_2O}°,$$

one may cool the autoclave down before the release of water to a temperature T at which the density of saturated steam $\rho_T$ is $$\rho_T \leq 0.3 \, \rho_{300°\,C}$$

Figure 2:
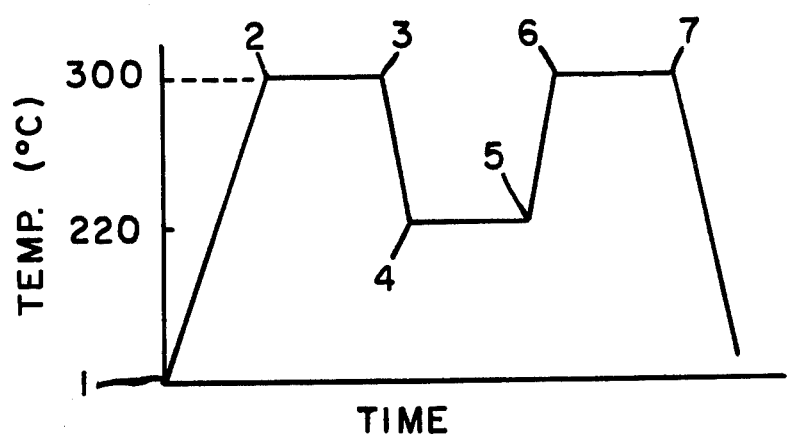
FIG. 2 illustrates the time-temperature pressure relationships used in the complete hydration-dehydration process.

By plotting the density of water vapor (gm/cm³) against the increasing temperature, one can readily find that T is 227° C. At that temperature or below, it is possible to expel 1554 grams of water from the bottom outlet of the autoclave without decreasing total pressure or taking out nitrogen in the vapor phase. The hydration-dehydration process is graphically summarized in FIG. 2 with the following numerical designations for the steps.

1. 2000 cc of water and 1000 g of the preferred glass is fed into the 28l autoclave at room temperature.
2. Temperature is raised to 300° C.
3. $N_2$ added to increase $P_T$ from 1246 psi to 1500 psi 4. After temperature is dropped to 220° C, 1554 g of water is withdrawn from the bottom outlet of the autoclave.
5. $P_T$ is increased to 1290 psi.
6. Temperature is increased to 300° C, $P_T$ is increased to 1500 psi due to thermal energy.
7. Temperature is cooled down to room temperature at constant $P_T$, e.g. 1500 psi. ($P_T \geq 1.25 \, P_{H_2O}°$, e.g. $P_T$ = constant = 1500 psi).

Although nitrogen was the inert gas used in the dehydration step, it can be appreciated that the use of other inert gases is possible. Thus, as used herein, the expression inert gas refers to any gas the constituents of which are non-reactive with the hydrated glass (e.g. nitrogen, helium, neon, argon, etc. and even oxygen, but not reactive gases such as $CO_2$).

A glass disc which had been hydrated and dehydrated as in the above example was then molded as a preform. A "preform" may be obtained by cutting a hydrated-partially dehydrated glass plate to a size to fit a mold cavity — e.g. a preform for a molded 0.5 inch dia. lens may be a plano disc of 0.5 inch diameter. The preform consisted, on an anhydrous basis, in mole percent, of 77.00% $SiO_2$, 10.82% $Na_2O$, 3.04% $K_2O$, 1.29 $Al_2O_3$, and 7.79% ZnO. The glass preform was cut from the dehydrated glass and then molded at 300° C. at 8,000 psi against a pair of flat tungsten carbide surfaces (within a die assembly) having an optical quality surface. The final molded product had a surface smoothness Roughness Height of 0.5 microinches, a refractive index of 1.50290 ± 5 × 10⁻⁵, and a durability sufficient to easily pass the American Optical Durability Test. Light transmission (throughout visible light) was found to be 92.0%. Theoretical transmittance is 92.0%. In view of the above characteristics, it is clear that the present disclosure provides a method for molding high quality optical articles having excellent light transmission and durability. One preferred final form is an optical quality aspheric lens although other applications include the use of the above-described glass molding methods for optical flats, Fresnel lenses, reflectors, video discs, and various microoptic components. The method may be used in any application requiring a high quality optical glass article having an optical quality surface (e.g. our best surface smoothness to date is about 0.5 $\mu$ inch AA Roughness Height from non-polished preform and better from a polished preform) and bulk homogeneity of water content, thereby permitting theoretical light transmission.

In a manner similar to the above example, another ½ inch disc was, prior to molding, ground and polished to a flat optical quality surface. The polished disc was then successfully molded on a tungsten carbide (WC) die having an optical quality surface and spherical surface figure (f/1). The surface figure of the die (spherical) was imparted to the disc which, prior to molding, had been flat. In can be appreciated that this technique of imparting the surface figure of the die to the molded glass article permits the use of a preformed article which may or may not be ground and polished, depending on the economics involved in preparing a final article. For example, in preparing an aspherical lens, a very large part of the cost is due to "figuring" the lens, e.g., changing a relatively inexpensive spherical surface to a much more expensive ("figured") aspherical surface. In this case, the ability to duplicate the surface figure of the die adds considerable value to the final product. Hence, one may, prior to molding, grind and polish the partially dehydrated article to achieve an optical quality surface which is relatively inexpensive to prepare (e.g. a flat or spherical surface figure) and then use the molding step to obtain the surface figure (e.g. aspheric) of the die. It should be noted that in some cases, even though the die has an optical quality surface, as defined above, that surface may be inferior to that which can be obtained by grinding and polishing the glass to an optical quality surface having a relatively inexpensively obtained surface figure (e.g. flat or spherical). In this case, it would be desirable to duplicate only the surface figure of the die and not the inferior (yet optical quality) surface. To accomplish this, the molding temperature should be controlled to permit duplication of only the surface figure of the die. In other cases, both the optical quality surface of the die and the die surface figure of the die may be transferred to the glass via the molding step. Even though it may be possible to obtain an optical quality surface on polished glass that is "better" than that obtainable on the die, in all cases the die must still have an optical quality surface, regardless of surface figure.

The theoretical transmission value was obtained experimentally for the transmittance of the first molded disc. Fringes noticed in the transmission interferograph were very sharp and are accounted for by the measured surface figures of the mold. This indicated an optically perfect interior as well as a precise reproduction of mold surface figure. Moreover, an experiment which aimed to test if the molded disc is diffraction limited in its optical quality of the bulk, showed that the fractional energy of the deflected beam is below the noise level of the detecting system employed. Additional evidence of the bulk optical quality of a molded lens is illustrated by comparing the airy discs given by a very good (i.e. diffraction limited) objective lens with and without a molded plano disc in a light passage. Wave front surface distortion of only about $(1/16)\lambda$ can be attributed to the molded plano disc which was ground and polished on one side only to get a good parallelism. The sample thickness was 2.24 mm. It should be noted that the bulk homogeneity of the lens prepared in accordance with the method disclosed herein is the same or better than that of corresponding starting anhydrous glass. No evidence of strain has been observed in the molded samples of the present invention, when examined under a polariscope.

Since the above described methods are subject to numerous variations apparent to those skilled in the art, it is intended that the scope of this invention should be limited only by the appended claims.

We claim:

1. A hydrated glass article consisting essentially, in mole percent on the anhydrous basis, of about 70–82% $SiO_2$, 10–17% $Na_2O$ and/or $K_2O$, and 5–15% ZnO and/or PbO, and having a water content of about 3–8% by weight of the total article, said water content being tightly bound within the article such that, upon DTG analysis, the glass demonstrates no water loss below about 120° C. and consisting of silanol groups and molecular water present in such proportions that the ratio of silanol groups to molecular water is equal to or greater than 1.0, said glass article having at least one portion with the surface thereof having a smoothness such that over a distance of at least 0.1 inch, on an arithmetic average basis, the Roughness Height is less than 3.0 microinches and having a substantially uniform refractive index thoughout the bulk of the glass such that a transmissivity of visible light of about 92% is demonstrated.

2. The glass article of claim 1 wherein the inorganic oxide constitutents include up to 5 mole % $Al_2O_3$ and/or $ZrO_2$.

3. The glass article of claim 1 wherein the inorganic oxide constituents include up to 3 mole % $B_2O_3$, BaO, or MgO.

4. The glass article of claim 1 wherein the article is in the form of an optical lens.

* * * * *

UNITED STATES PATENT OFFICE
CERTIFICATE OF CORRECTION

PATENT NO. : 4,093,469

DATED : June 6, 1978

INVENTOR(S) : Leon M. Sanford and Che-Kuang Wu

It is certified that error appears in the above-identified patent and that said Letters Patent are hereby corrected as shown below:

Column 7, line 29, "281" should be -- 28ℓ --.

Column 7, line 34, "281" should be -- 28ℓ --.

Column 7, line 66, "281" should be -- 28ℓ --.

Signed and Sealed this

Sixth Day of March 1979

[SEAL]

Attest:

RUTH C. MASON
*Attesting Officer*

DONALD W. BANNER
*Commissioner of Patents and Trademarks*